United States Patent
Hunt et al.

(10) Patent No.: US 10,595,462 B2
(45) Date of Patent: Mar. 24, 2020

(54) HARVESTER HEAD REEL SEGMENTS SYNCHRONIZATION

(71) Applicant: Deere and Company, Moline, IL (US)

(72) Inventors: Timothy S. Hunt, Davenport, IA (US);
Paul D. Marvin, Dewitt, IA (US);
Madan M. Rajendran, Bettendorf, IA (US)

(73) Assignee: Deere & Company, Moline, IL (US)

( * ) Notice: Subject to any disclaimer, the term of this patent is extended or adjusted under 35 U.S.C. 154(b) by 247 days.

(21) Appl. No.: 15/640,435

(22) Filed: Jun. 30, 2017

(65) Prior Publication Data

US 2019/0003496 A1    Jan. 3, 2019

(51) Int. Cl.
    *A01D 57/04*      (2006.01)
    *A01D 57/02*      (2006.01)
    (Continued)

(52) U.S. Cl.
CPC .............. *A01D 57/04* (2013.01); *A01B 63/10* (2013.01); *A01D 41/14* (2013.01); *A01D 41/141* (2013.01); *A01D 41/144* (2013.01); *A01D 57/02* (2013.01); *A01D 57/05* (2013.01); *A01D 57/12* (2013.01); *F15B 11/22* (2013.01); *F15B 21/08* (2013.01); *A01D 34/04* (2013.01); *F15B 2211/665* (2013.01); *F15B 2211/7128* (2013.01); *F15B 2211/7656* (2013.01); *F15B 2211/782* (2013.01)

(58) Field of Classification Search
CPC .......... A01D 57/04; A01D 57/02; F15B 11/22
See application file for complete search history.

(56) References Cited

U.S. PATENT DOCUMENTS

| | | | |
|---|---|---|---|
| 4,335,894 | A | 6/1982 | Swanson |
| 4,407,109 | A | 10/1983 | Swanson et al. |

(Continued)

FOREIGN PATENT DOCUMENTS

| | | |
|---|---|---|
| DE | 3605933 | 8/1987 |
| DE | 102015109191 | 12/2015 |

(Continued)

OTHER PUBLICATIONS

European Search Report for 18179534.5-1006 dated Nov. 21, 2018.
EP Search Report for 18179536 dated Oct. 12, 2018.

*Primary Examiner* — Alicia Torres
(74) *Attorney, Agent, or Firm* — Rath Lindenbaum LLP

(57) ABSTRACT

A harvester head may include a position adjustable reel having a first segment and a second segment, a hydraulic supply comprising a pump and a reservoir, a first plurality of hydraulic cylinders coupled to the first segment to reposition the first segment, a second plurality of hydraulic cylinders coupled to the second segment to reposition the second segment, a first bidirectional valve operably coupled between the hydraulic supply and the first plurality of hydraulic cylinders, a second bidirectional valve operably coupled between the hydraulic supply and the second plurality of hydraulic cylinders, at least one sensor to sense relative positioning of the first segment and the second segment and a controller. The controller may output control signals to the first bidirectional valve and the second bidirectional valve based upon signals from the at least one sensor to synchronize positioning of the first segment and the second segment.

20 Claims, 9 Drawing Sheets

(51) Int. Cl.
*F15B 11/22* (2006.01)
*A01D 41/14* (2006.01)
*A01D 57/05* (2006.01)
*A01B 63/10* (2006.01)
*A01D 57/12* (2006.01)
*F15B 21/08* (2006.01)
*A01D 34/04* (2006.01)

(56) References Cited

U.S. PATENT DOCUMENTS

| | | |
|---|---|---|
| 4,655,031 A | 4/1987 | Kucera |
| 4,715,172 A | 12/1987 | Mosby |
| 5,311,808 A | 5/1994 | Ando |
| 5,449,042 A | 9/1995 | Landphair et al. |
| 6,000,315 A | 12/1999 | Graham et al. |
| 6,651,411 B1 * | 11/2003 | Becker .................. A01D 57/04 56/10.2 A |
| 7,478,683 B2 | 1/2009 | Peck et al. |
| 7,669,392 B2 | 3/2010 | Ehrhart |
| 7,717,025 B2 | 5/2010 | Webster et al. |
| 9,127,695 B2 | 9/2015 | Lougheed |
| 2002/0170785 A1 | 11/2002 | Stockmann |
| 2006/0213715 A1 | 9/2006 | Krieger |
| 2007/0204583 A1 * | 9/2007 | Coers .................... A01D 57/02 56/14.4 |
| 2015/0156948 A1 | 6/2015 | Henry |
| 2016/0205862 A1 | 6/2016 | Sudbrink et al. |

FOREIGN PATENT DOCUMENTS

| | | |
|---|---|---|
| EP | 0326836 | 8/1989 |
| EP | 2253195 | 11/2010 |

\* cited by examiner

HARVESTER HEAD REEL SEGMENTS SYNCHRONIZATION

CROSS-REFERENCE TO RELATED PATENT APPLICATIONS

The present application is related to co-pending U.S. patent application Ser. No. 15/640,432, filed on the same day herewith by Hunt et al. and entitled HARVESTER HEAD REEL REPHASING, the full disclosure of which is hereby incorporated by reference.

BACKGROUND

Harvesters are utilized to gather and harvest a crop. Such harvesters may include a head which separates the crop from the underlying growing medium and feeds the crop into the harvester. Depending upon the crop being harvested, such heads may include a cutter bar which severs the crop and a reel which is rotated to move the crops towards the cutter bar and into an auger and/or onto draper belt. During use, the reel may be repositioned in an upward/downward direction or in a rearward/forward direction. In many harvesters, the reel may be formed of multiple segments that collectively span a width of the head.

DETAILED DESCRIPTION OF EXAMPLES

Figure 1:
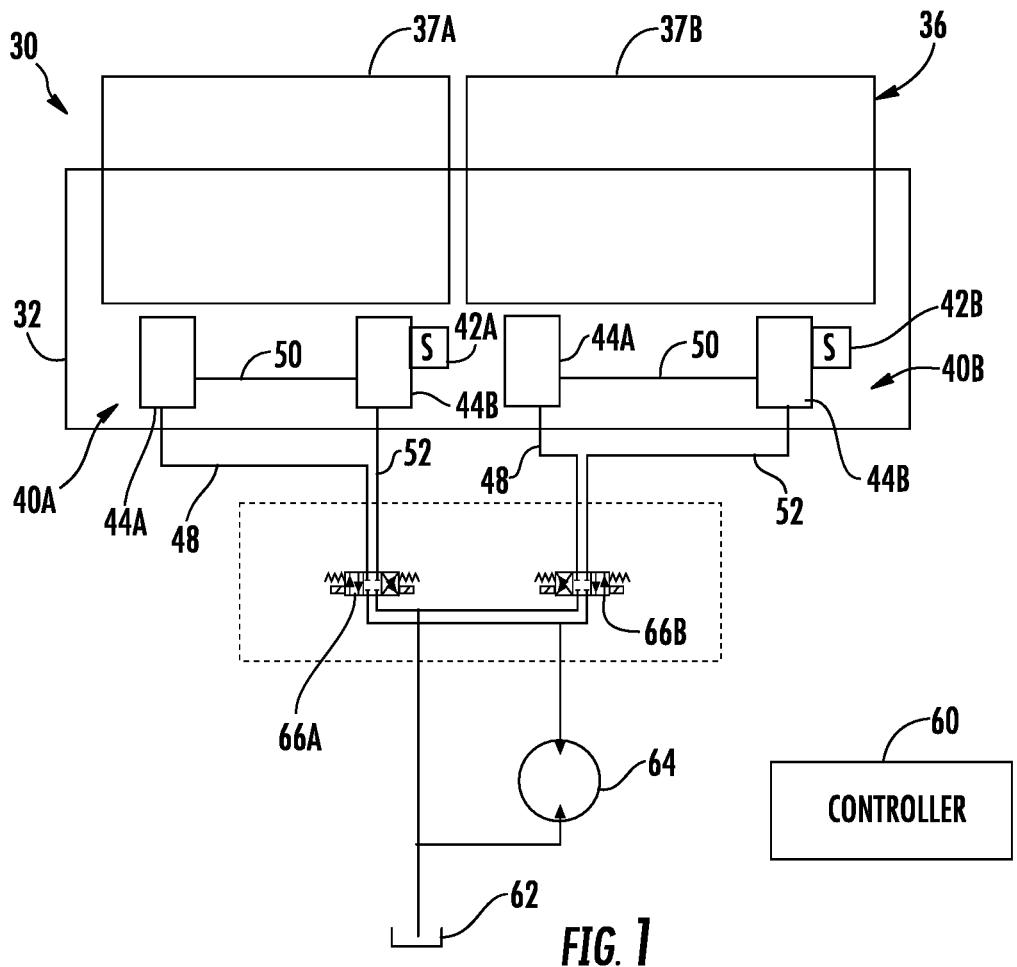
FIG. 1 is a schematic diagram of portions of example reel positioning systems of an example harvester head.

Many harvesters have reels that are formed by multiple distinct segments that collectively span a width of the harvester head. During use, such segments may become out of sync with one another. For example, one segment of the real may be higher than another segment of the real. One segment of the real may be more forward than another segment of the real.

Disclosed herein are examples of a harvester head which assists in maintaining segments of a harvester head reel in synchronization with one another. Disclosed herein are examples of a harvester head which assists in maintaining segments of a harvester head reel at the same vertical height. Disclosed herein are examples of a harvester head which assists in maintaining segments of a harvester head real at the same fore-aft position.

Disclosed herein is an example harvester head which comprises a position adjustable reel having a first segment and a second segment, a hydraulic supply comprising a pump and a reservoir, a first plurality of hydraulic cylinders coupled to the first segment to reposition the first segment, a second plurality of hydraulic cylinders coupled to the second segment to reposition the second segment, a first bidirectional valve operably coupled between the hydraulic supply and the first plurality of hydraulic cylinders, a second bidirectional valve operably coupled between the hydraulic supply and the second plurality of hydraulic cylinders, at least one sensor to sense relative positioning of the first segment and the second segment and a controller. The controller may output control signals to the first bidirectional valve and the second bidirectional valve based upon signals from the at least one sensor to synchronize positioning of the first segment and the second segment.

Disclosed herein is an example method for positioning a multi-segment harvester head reel. The method comprises sensing a relative position of a first segment of a reel of a harvester head with respect to a second segment of the reel of the harvester head, comparing the sensed relative position to a predetermined threshold and repositioning a first bidirectional valve to actuate a plurality of hydraulic cylinders coupled to the first segment and repositioning a second bidirectional valve to actuate a second plurality of hydraulic cylinders coupled to the second segment, based upon the comparison, to synchronize positioning of the first segment and the second segment.

Disclosed herein is an example harvester head that may comprise a frame, a position adjustable reel having a first segment and a second segment movably supported by the frame, a hydraulic supply comprising a pump and a reservoir, a first plurality of hydraulic cylinders coupled to the first segment to reposition the first segment, a second plurality of hydraulic cylinders coupled to the second segment to reposition the second segment and a controller. The first plurality of hydraulic cylinders may include a first hydraulic cylinder and a second hydraulic cylinder. The first hydraulic cylinder may comprise a first barrel housing a first displaceable piston separating an interior of the first barrel into a rod side and a cap side, wherein the first displaceable piston has a first rod connected to a first portion of a respective one of the first segment and the second segment. The second hydraulic cylinder may comprise a second barrel housing a second displaceable piston separating an interior of the second barrel into a rod side and a cap side, wherein the second displaceable piston has a second rod connected to a second portion of the first segment. A first hydraulic fluid line connects the hydraulic supply to the rod side of the first hydraulic cylinder. A second hydraulic fluid line connects the cap side of the first hydraulic cylinder to the rod side of the second hydraulic cylinder. A first selectively actuatable rephasing valve fluidly couples the rod side of the first hydraulic cylinder to the rod side of the second hydraulic cylinder. A second selectively actuatable rephasing valve fluidly couples the cap side of the second hydraulic cylinder to the hydraulic supply.

The second plurality of hydraulic cylinders is coupled to the second segment to reposition the second segment. The second plurality of hydraulic cylinders may include a third hydraulic cylinder and a fourth hydraulic cylinder. The third hydraulic cylinder may include a third barrel housing a third displaceable piston separating an interior of the third barrel into a rod side and a cap side, wherein the third displaceable piston has a third rod connected to a first portion of the second segment. The fourth hydraulic cylinder may include a fourth barrel housing a fourth displaceable piston separating an interior of the fourth barrel into a rod side and a cap side, wherein the fourth displaceable piston has a fourth rod connected to a second portion the second segment. A third hydraulic fluid line connects the hydraulic supply to the rod side of the third hydraulic cylinder. A fourth hydraulic fluid line connects the cap side of the third hydraulic cylinder to the rod side of the fourth hydraulic cylinder. A third selectively actuatable rephasing valve fluidly couples the rod side of the third hydraulic cylinder to the rod side of the fourth hydraulic cylinder. A fourth selectively actuatable rephasing valve fluidly couples the cap side of the fourth hydraulic cylinder to the hydraulic supply.

A first bidirectional valve is operably coupled between the hydraulic supply and the first plurality of hydraulic cylinders. A second bidirectional valve is operably coupled between the hydraulic supply and the second plurality of hydraulic cylinders. A first sensor senses a stroke position of one of the first hydraulic cylinder and the second hydraulic cylinder. A second sensor senses a stroke position of one of the third hydraulic cylinder and the fourth hydraulic cylinder. The controller (1) selectively actuates the first rephasing valve and the second rephasing valve based upon signals from the first sensor; (2) selectively actuates the third rephasing valve and the fourth rephasing valve based upon signals from the second sensor; and (3) selectively actuates the first bidirectional valve and the second bidirectional valve based upon a comparison of signals from the first sensor and the second sensor to synchronize positioning of the first segment and the second segment.

For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members. The term "fluidly coupled" shall mean that two or more fluid transmitting volumes are connected directly to one another or are connected to one another by intermediate volumes or spaces such that fluid may flow from one volume into the other volume.

For purposes of this disclosure, the phrase "configured to" denotes an actual state of configuration that fundamentally ties the stated function/use to the physical characteristics of the feature proceeding the phrase "configured to".

FIG. 1 schematically illustrates portions of an example harvester head 30 for being carried by a harvester. Head 30 interacts with a crop being harvested to facilitate its separation from a growing medium in the directing of the separated crop into the harvester. Head 30 comprises frame 32, real 36 and reel positioning system 40. Frame 32 comprises a structure which movably supports real 36. In one implementation, frame 32 is removably mountable to a harvester. In another implementation, frame 32 is fixedly joined to the remainder of a harvester.

Real 36 comprises a wheel-like structure that is rotatably supported relative to frame 32 so as to gather and direct crop into header 30. Reel 36 is adjustable between a plurality of positions so as to move the rotational axis of real 36. In one implementation, real 36 is movable in a four-aft (forward-rearward) direction as well as a vertical (upward-downward) direction relative to frame 32. In one implementation, real 36 comprises a plurality of circumferentially spaced bats that are rotated to engage and gather the crop. In one implementation, real 36 extends across an entire width or swath of harvester head 30. In another implementation, real 36 comprises just one of many real segments of a larger overall reel assembly that collectively span the width or swath of the harvester.

Harvester head 30 comprises frame 32, real 56, positioning systems positioning systems 40A, 40B (collectively referred to as positioning systems 40), sensors 42A, 42B (collectively referred to as sensors 42), and controller 60. Real 536 is formed by at least two segments 37A, 37B (collectively referred to as segments 37). Although two of such segments as shown, it should be appreciated that real 36 may be formed by multiple sets of side-by-side segments similar to the example side-by-side segments 37A, 37B. For example, real 36 may comprise three of such segments, wherein the middle segment forms part of two pairs of side-by-side segments. In another implementation, real 36 may comprise greater than three of such segments forming two or more pairs of side-by-side segments.

Positioning systems 40A, 40B selectively and controllably reposition segments 37A and 37B, respectively. Each of positioning systems 40 comprise a plurality of hydraulic cylinders 44A, 44B (collectively referred to as hydraulic cylinders 44) and a bidirectional valve 66A, 66B (collectively referred to as bidirectional valve 66). Positioning systems 40 share a fluid reservoir 62 and a bidirectional pump 64. Positioning system 540 are both controlled by controller 60 which, as will be described hereafter, facilitates synchronization of positioning systems 40.

Sensors 42A, 42B comprise sensing devices or elements that output signals that correspond to or that otherwise indicate the positioning of segments 37A, 37B, respectively. In one implementation, sensors 42 directly sense the positioning of their respective segments 37. In another implementation, sensors 42 sense the positioning of the piston and/or rod of at least one of cylinders 44. In one implementation, sensors 42 may comprise rotary Hall effect sensors. In another implementation, sensors 42 may comprise other forms of sensing devices such as photo emitter-detector sensing elements.

Controller 60 comprises a processing unit or other electronic circuitry that controls the operation of each of positioning systems 40. Controller 60 may be in the form of a processing unit that follows instructions contained in a non-transitory computer-readable medium to control the operation of positioning systems 40. Controller 60 may be in the form of electronic circuitry or logic elements, such as an application-specific integrated circuit, that controls the operation of positioning systems 40. Controller 60 may comprise a combination of both a processing unit that follows instructions and circuitry or logic elements. Controller 60 may be contained in a single unit or may be distributed across multiple controller elements. In one implementation controller 60 is supported by frame 32 of head 30. In another implementation, controller 60 is remotely supported relative to frame 32.

To reposition each of segments 537 in a first direction (upward/downward or forward/rearward), controller 60 actuates valves 66 and pump 64 such that hydraulic fluid is pumped through hydraulic fluid lines 48 into cylinder 44A resulting in fluid also being driven or pumped through hydraulic fluid line 50 into cylinder 44B to drive or move both distinct portions of the respective segment 37A, 37B in the first direction. Hydraulic fluid is returned to reservoir 62 through hydraulic fluid line 52. Likewise, to reposition each of segments 537 in a second direction (downward/upward or forward/rearward) controller 60 actuates valves 66 and pump 64 such that hydraulic fluid is pumped through hydraulic fluid lines 52 into cylinder 44B resulting in fluid also being driven or pumped through hydraulic fluid line 50 into cylinder 44A to drive or move both distinct portions of the respective segment 37A, 37B in the second direction. Hydraulic fluid is returned to reservoir 62 through hydraulic fluid line 48. In one implementation, hydraulic fluid line 50 connects the cap side of a piston of one hydraulic cylinder 44A, 44B to the rod side of the piston of the other hydraulic cylinder 44A, 44B. In another implementation, hydraulic fluid line 50 connects the cap side of a piston of one hydraulic cylinder 44A, 44B to the same cap side of the piston of the other hydraulic cylinder 44A, 44B or connects the rod side of the piston of one hydraulic cylinder 44A, 44B to the same rod side of the piston of the other hydraulic cylinder 44A, 44B, wherein the rods of cylinders 44A, 44B are each connected to different portions of the respective segment 37A, 37B such that extension of one of the rods and retraction of the other of the rods move the respective segment 37 in the same direction.

During use, such segments 37 may become out of sync with one another. For example, one of segments 37 of the reel 36 may be higher than another of segments 37 of the real 36. One of segments 37 of the real 36 may be more forward than another one of segments 37 of the real 36. Controller 60 assists in maintaining segments 37 of a harvester head reel 36 in synchronization with one another. In one implementation, controller 60 assists in maintaining segments 37 of a harvester head reel 36 at the same vertical height. In one implementation, controller 60 assists in maintaining segments 37 of harvester head real 36 at the same fore-aft position.

To maintain segments 37 in synchronization with one another, controller 60 selectively actuates valves 66 two differently move segments 37 such that segment 37 are once again positioned at the same position relative to one another. For example, in one implementation, controller 60 may move one of segments 37 to a selected position while the other segment 37 remains stationary at the selected position. In one implementation, the selected position may be an end of stroke position for one of the hydraulic cylinders. In another implementation, controller 60 may move one of segments 37 at a first rate while the other of segments 37 is moved at a second greater rate until signals from sensors 40 to indicate that both segments 37 are at the selected position.

The initiation of the synchronization of segments 37 of real 36 may be triggered in a variety of different manners. In one implementation, a person or operator may input a command or selection to controller 60 triggering such synchronization. In another implementation, such synchronization may be automatically triggered based upon signals received from sensors 42. For example, in one implementation, controller 60 may determine the relative positioning of segments 37 by comparing the signals from sensors 42 or by comparing values derived from such signals to determine a relative difference in the positioning of segments 37. Controller 60 may further compare the determined relative difference to a predetermined triggering threshold and automatically initiate such synchronization in response to the predetermined triggering threshold being satisfied. As noted above, the signals from sensors 42 used as a basis for determining when to trigger such synchronization may be signals resulting from the direct sensing of the positioning of segments 37 or may be signals resulting from the indirect sensing of the position of segments 37, the sensing of the positioning of the piston and/or rod of at least one of cylinders 44.

In those implementations where the initiation of synchronization is automatically triggered based upon a comparison of the sensed relative positioning of segments 37 or the sensed positioning difference between segments 37 to a predetermined threshold, the value of the predetermined threshold may vary based upon other operating conditions of head 30 or the harvester utilizing head 30. For example, the predetermined threshold that is used for automatically triggering such synchronization may change based upon a sensed, determined or operator inputted crop flow, a sensed, determined or operator inputted ongoing grain yield, a sensed, determined or operator inputted speed of real 36, a sensed, determined or operator inputted speed at which the harvester is traversing a field, the sensed, determined or operator inputted current vertical and/or longitudinal positions of real 36, the sensed, determined or operator inputted type of crop being harvested or the like. Likewise, the frequency at which synchronization is automatically carried out may also vary based upon such sensed, determined or operator inputted factors.

In another implementation, controller 60 may automatically carry out synchronization of the positioning of segments 37 particular times regardless of any sensed differences in the positioning of segments 37. For example, in one implementation, controller 60 may initiate such synchronization automatically when signals from sensors 40 to indicate one of segments 37 to be in an extreme position such as a fully raised or fully lowered position (in implementations where positioning systems 40 vertically move segments 37) or in a fully forward or fully rearward position (in implementations where positioning systems 40 longitudinally move segments 37).

In one implementation, controller 60 may not initiate such synchronization each and every time that signals from sensors 40 to indicate that one of segments 37 is in an extreme position, but instead may initiate such synchronization at a predetermined or operator selected proportion of the times that one of segments 37 are in an extreme position. For example, an operator may input a setting such that synchronization is initiated once out of every X times that signals from sensor 42 indicate segments 37 to be in an extreme position. In some implementations, the frequency at which such automatic synchronization is carried out in response to one of segments 37 being at an extreme position may change based upon a sensed, determined or operator inputted crop flow, a sensed, determined or operator inputted ongoing grain yield, a sensed, determined or operator inputted speed of real 36, a sensed, determined or operator inputted speed at which the harvester is traversing a field, the sensed, determined or operator inputted current vertical and/or longitudinal positions of real 36, the sensed, determined or operator inputted type of crop being harvested or the like.

In another implementation, controller 60 may automatically initiate synchronization based upon other signals from the harvester utilizing head 30. For example, in another implementation, controller 60 may automatically initiate synchronization when other signals from other sensors in the harvester indicate that the rotation of real 36 has been paused or when other signals from other sensors in the harvester indicate that the harvester is not receiving crop for a predetermined threshold amount of time. For example, in one implementation, controller 60 may automatically initiate synchronization in response to signals indicating that the harvester is turning to engage a new swath or series of crop rows. Such other sensors may comprise optical sensors, grain mass flow sensors, impactor or strain sensors located in the head 30 or various other forms of sensors indicating the operational state of head 30 or other portions of the harvester employing head 30.

Figure 2:
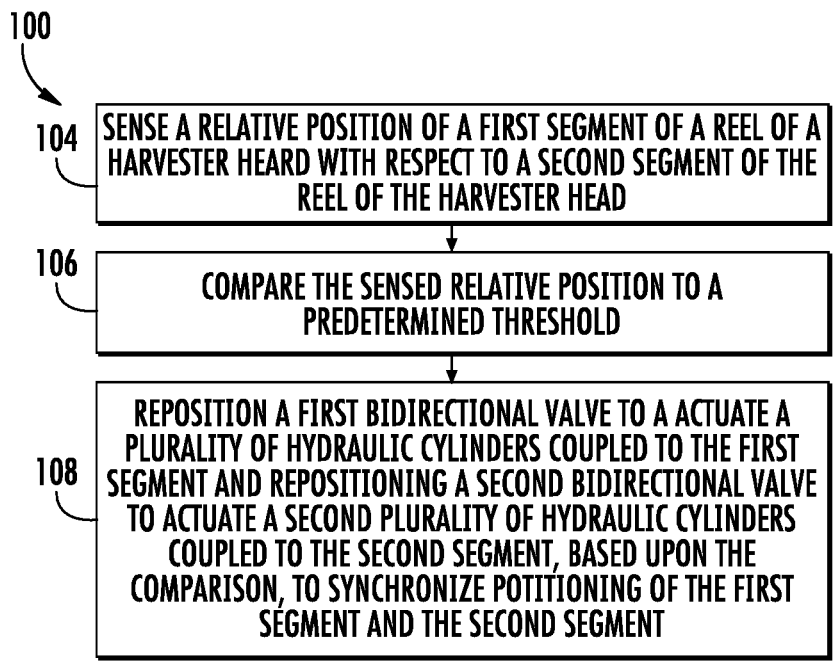
FIG. 2 is a flow diagram of an example method for synchronizing segments of an example multi-segment real of an example harvester head.

FIG. 2 is a flow diagram of an example method 100 for operating a harvester head real positioning system. Method 100 addresses circumstances where different segments of a multi-segment real may be out of synchronization with one another. Although method 100 is described as being carried out by system 40 in head 30, it should be appreciative that method 100 may be carried out with any of the other harvester heads and positioning system describing this disclosure as well as other harvester heads and real positioning systems having similar configurations.

As indicated by block 104, the relative position of a first segment of a multisegment real of a harvester head is sensed relative to the position of a second segment of the multi-segment real of the harvester head. In the above example, sensors 42 sense the relative position of segment 37A with respect to 37B. As described above, in some implementations, such sensors 42 may sense the relative position of the different segments 37 by directly sensing the positions of segments 37. In other implementations, such sensors 42 may indirectly sense the relative position of segments 37 by sensing the relative positions of the pistons and/or rods of the hydraulic cylinders 44 connected to the different segments 37. Such sensing may be carried out by sensors such as cameras or other optical sensor/detector's, rotary Hall effect sensors and the like.

As indicated by block 106, controller 60 receives such signals and compares the sensed relative positions of the segments to a predetermined threshold. In one implementation, controller 60 determines a difference between the relative positions and compares the difference to a predetermined threshold. In one implementation, threshold may be a maximum extent to which segments 37 are permitted to be offset respect to one another.

As indicated by block 108, controller 60 repositions bidirectional valves 66 to differently actuate the hydraulic cylinders 44 coupled to the different segments 37 based upon the comparison so as to synchronize positioning of segments 37. In one implementation, such synchronization is carried out by controller 60 repositioning valve 66 and actuating cylinders 44 such that both of segments 37 are at an extreme position. In one implementation, such synchronization is carried out by controller repositioning valve 66 and actuating cylinders 44 such that at least one of hydraulic cylinders 44 of each of segments 37 is at an end of stroke position or state.

Figure 3:
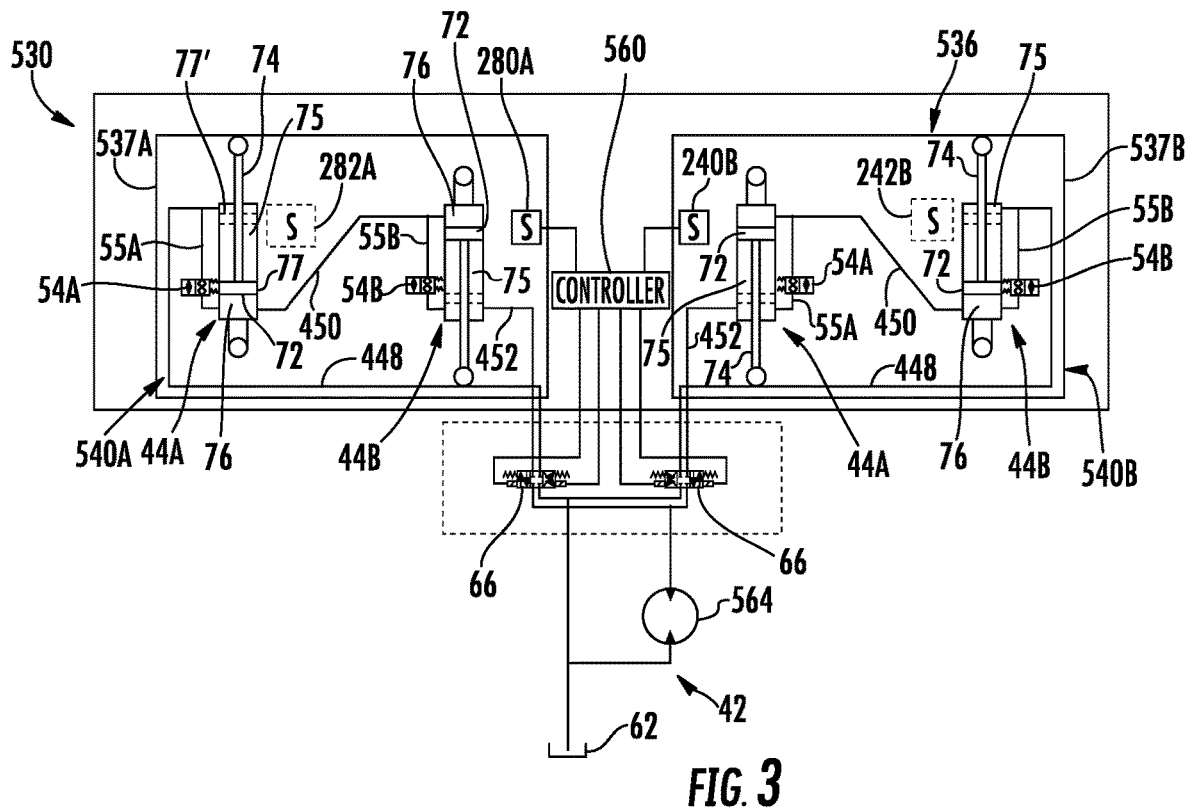
FIG. 3 is a schematic diagram of portions of example reel positioning systems of an example multi-segment reel of a harvester head.

FIG. 3 schematically illustrates portions of another example harvester head 530. Like harvester head 30, harvester head 530 provides for synchronization of the positioning of different segments of a multi-segment real. In the example illustrated, harvester head 530 additionally provides for rephasing of the hydraulic cylinders of each individual positioning system. Harvester head 530 comprises reel 536, positioning systems 540A, 540B (collectively referred to as positioning systems 540), sensors 280A, 280B (collectively referred to as sensors 580), and controller 560. Reel 536 is formed by at least two segments 537A, 537B (collectively referred to as segments 537). Although two of such segments as shown, it should be appreciated that reel 536 may be formed by multiple sets of side-by-side segments similar to the example side-by-side segments 537A, 537B. For example, reel 536 may comprise three of such segments, wherein the middle segment forms part of two pairs of side-by-side segments. In another implementation, reel 536 may comprise greater than three of such segments forming two or more pairs of side-by-side segments.

Positioning systems 540A, 540B selectively and controllably reposition segments 537A and 537B, respectively. Each of positioning systems 540 is similar to positioning system 440 described above except that positioning systems 540 share fluid reservoir 62 and a bidirectional pump 564. Positioning system 540 are both controlled by controller 560 which, as will be described hereafter, facilitate synchronization of positioning systems 540.

Similar to positioning system 440, in addition to the shared controller 560, reservoir 62 and bidirectional pump 564, each of positioning systems 540 comprises hydraulic cylinders hydraulic cylinders 44A, 44B (collectively referred to as hydraulic cylinders 44), hydraulic line 448, hydraulic line 450, hydraulic line 452 and rephasing valves 54A, 54B (collectively referred to as rephasing valve 54), each of which is described above respect to system 440. As with head 430, hydraulic cylinders 44 of head 530 are each coupled to different portions of a respective one of segments 537 so as to reposition such different portions of the respective segment 537. Hydraulic cylinders 44 cooperate with one another to reposition the respective segment 537. In one implementation, hydraulic cylinders 44 reposition the respective segment 537 by raising or lowering respective segment. In another implementation, hydraulic cylinders 44 reposition the respective segment by moving the respective segment in a forward or rearward direction.

Controller 560 comprises a processing unit or other electronic circuitry that controls the operation of each of positioning systems 540. Controller 560 may be in the form of a processing unit that follows instructions contained in a non-transitory computer-readable medium to control the operation of positioning systems 540. Controller 560 may be in the form of electronic circuitry or logic elements, such as an application-specific integrated circuit, that controls the operation of positioning systems 540. Controller 560 may comprise a combination of both a processing unit that follows instructions and circuitry or logic elements. Controller 560 may be contained in a single unit or may be distributed across multiple controller elements. In one implementation controller 560 is supported by frame 32 of head 530. In another implementation, controller 560 is remotely supported relative to frame 32.

During normal operation (not a time of rephasing), rephasing valves 54 are maintained in a closed or blocking state. To reposition each segment 537 in a first direction (upward/downward or forward/rearward), controller 560 actuates valves 66 and pump 564 such that hydraulic fluid is pumped through hydraulic fluid lines 448 into rod side 75 of piston 72 in cylinder 44A of each of segments 537. This results in rods 74 of cylinders 44A being retracted. This also results in fluid on cap sides 76 flowing through hydraulic fluid line 450 to cap side 76 of piston 72 of cylinders 44B. This results in rods 74 being extended. Because the volume of both cap sides 76 are the same or approximate the same, rod 74 of cylinders 44A and 44B retracted and extend by substantially the same extent, respectively, to reposition segments 537 in the first direction.

Likewise, to reposition segments 537 in a second direction, opposite to the first direction, controller 560 actuates valves 66 and pump 564 such that hydraulic fluid is pumped through hydraulic fluid lines 452 into rod side 75 of piston 72 in cylinders 44B. This results in rod 74 of cylinders 44B being retracted. This also results in fluid on cap side 76 flowing through hydraulic fluid line 450 to cap side 76 of pistons 72 of cylinders 44A. This results in rods 74 being retracted. Because the volume of both cap sides 76 are the same or approximate the same, rods 74 of cylinders 44A and 44B extend and retract by substantially the same extent, respectively, to reposition segments 537 in the second direction.

As described above, over time, the positioning of pistons 72 and cylinders 44 may become offset from one another such that when rod 74 of each of cylinders 44A is fully extended, rod 74 of each of cylinders 44B is not fully retracted, and vice versa. This may result in the individual segments 537 becoming canted or tilted in the vertical and/or horizontal direction. To address such an occurrence, controller 560 is configured to carry out rephasing of piston 72 of cylinders 44. Controller 560 is configured to individually and independently carry out rephasing with respect to each of segments 537. Such rephasing of the cylinders 44 associated with segments 537 may be carried out independent of one another with only one of the pair of segments 537 having its hydraulic cylinders being rephased, may be carried out sequentially or may be carried out concurrently.

The following describes rephasing of cylinders with respect to segment 537A. It should be appreciated that such rephasing may be likewise carried out with respect to cylinders of segment 537B. During such rephasing, controller 560 outputs control signals that actuate each of rephasing valves 54 to the open or pass-through state. Controller 560 further outputs control signals to valve 566 and pump 64 so as to pump hydraulic fluid through hydraulic fluid lines 448 to side 75 of hydraulic cylinder 44A. Due to the larger volume of the interior of side 75 of barrel 70 cylinder 44A and the natural fluid resistance in the hydraulic line of rephasing valve 54A, the pressure of the hydraulic fluid being pumped into side 75 of cylinder 44A initially moves piston 72 of cylinder 44A to its end of stroke position 77. Once the end of stroke position 77 is attained by piston 72 of each of cylinder 44A, the pump hydraulic fluid is diverted across and through rephasing valve 54A through hydraulic line 450 to side 76 of hydraulic cylinder 44B, ensuring that piston 72 of cylinder 44B is also displaced to its end of stroke position 77'. Once piston 72 of cylinder 44B has attained its end of stroke position 77', the pump hydraulic fluid begins to pass through rephasing valve 54B or passes through valve 54B at a greater rate into hydraulic line 452 and back to reservoir 62 of fluid supply 42. Following a predetermined period of time or in response to signals indicating that pistons 72 are once again in phase with one another, controller 560 is configured to output control signals actuating rephasing valves 54 back to their fluid blocking or closed states.

Alternatively, to rephase pistons 72 at their other end of stroke positions, controller 560 is configured to output control signals that actuate each of rephasing valves 54 to the open or pass-through state. Controller 560 further outputs control signals to valve 66 and pump 564 so as to pump hydraulic fluid through hydraulic fluid line 452 to side 75 of hydraulic cylinder 44B. Due to the larger volume of the interior of side 75 of barrel 70 of cylinder 44B and the natural fluid resistance in the hydraulic lines of rephasing valve 54B, the pressure of the hydraulic fluid being pumped into side 75 of cylinders 44B initially moves piston 72 of cylinder 44B to its end of stroke position 77. Once the end of stroke position 77 is attained by piston 72 of cylinder 44B, the pump hydraulic fluid is diverted across and through rephasing valve 54B through hydraulic line 450 to side 76 of hydraulic cylinder 44A, ensuring that piston 72 of cylinder 44B is also displaced to its end of stroke position 77'. Once piston 72 of cylinder 44A has attained its end of stroke position 77', the pump hydraulic fluid begins to pass through rephasing valve 54A or passes through valve 54A at a greater rate into hydraulic line 448 and back to reservoir 62 of fluid supply 42. Following a predetermined period of time or in response to signals indicating that pistons 72 are once again in phase with one another, controller 560 is configured to output control signals actuating rephasing valves 54 back to their fluid blocking or closed states.

The initiation of rephasing in the individual positioning systems 540A, 540B may be triggered in a variety of different manners. In one implementation, a person or operator may input a command or selection to controller 60 triggering such rephasing for a selected one of system 540 or both of systems 540. In another implementation, such rephasing may be automatically triggered for a particular system 540a, 540B based upon the sensed positioning of piston 72 and/or rod 74 relative to an end of stroke position for the piston 72 and/or rod 74, such as with sensor 280A and/or 280B, each of which is similar to sensor 280 described above respect to system 440. In another implementation, such rephasing may be automatically triggered based upon a sensed position and/or orientation of the particular segment 537, such as with sensors 280, 282, wherein sensor 282, 282 sense positioning of different portions of the particular segment 537A, 537B. In another implementation, such rephasing may be triggered based upon a sensed relative positioning of piston 72 and/or rod 74 of different cylinders 44, based upon signals from sensors 280, 282, wherein sensor 280, 282 sense different positions of piston 72 and/or rod 74. In still another implementation, such rephasing may be automatically triggered based upon the receipt of an operator generated or a controller generated command instructing the repositioning of piston 72 and/or rod 74 to within a predetermined range of an end of stroke position 77, 77'.

In some circumstances, the two side-by-side segments 537 may themselves become offset relative to one another in a first direction (vertical direction or a fore-aft direction). Controller 560 is configured to further synchronize the positioning of segments 537 with respect to one another. To synchronize the positioning of segments 537 with respect to one another, controller 560 outputs control signals to valves 66 as well as rephasing valve 54 of each of systems 540 so as to reposition segments 537 at the same relative positions. In one implementation, controller 560 outputs control signals such that pistons 72 of cylinders 44 of both positioning systems 540 are actuated to the respective end of stroke positions such that both of segments 537 are fully raised, fully lowered, fully forward or fully rearward. In other words, positioning systems 540 are both rephased to an end of stroke state. In another implementation where the positioning of each of segments 537 is sensed by an associated sensor or where the positioning of each of pistons 72/rod 74 is sensed by an associated sensor (such as sensors 280, 282), controller 550 outputs control signals repositioning segments 537 such that segments 537 or piston 72/rod 74 are at the same relative positions (as determined from signals from the sensors) while piston 72 of cylinders 44 of each of systems 540 are at locations between their end of stroke positions.

The initiation of synchronization may be triggered in a variety of different manners. In one implementation, a person or operator may input a command or selection to controller 60 triggering such synchronization. In another implementation, such synchronization may be automatically triggered based upon the sensed positioning of piston 72 and/or rod 74 relative to an end of stroke position for the piston 72 and/or rod 74, such as with sensor 280A and/or 280B. For example, in response to receiving signals from sensor 280A and/or sensor 280B indicating an end of stroke position for a piston 72 or a near end of stroke position for piston 72, wherein when piston 72 is within a predetermined range of an end of stroke position, controller 560 may automatically carry out synchronization. In one implementation, controller 56 may automatically carry out rephasing with respect to both of systems 540 so as also synchronize systems 540.

In another implementation, such synchronization may be automatically triggered based upon a sensed relative positions and/or orientations of segments 537, wherein sensors 280 are configured to sense the positioning of their respective segments 537A, 537B. In another implementation, such synchronization may be triggered based upon a sensed relative positioning of piston 72 and/or rod 74 of different cylinders 44, based upon signals from sensors 280, 282, wherein sensor 280, 282 sense different positions of piston 72 and/or rod 74. In still another implementation, such synchronization may be automatically triggered based upon the receipt of an operator generated or a controller generated command instructing the repositioning of piston 72 and/or rod 74 of at least one of systems 540 to within a predetermined range of an end of stroke position 77, 77'.

Figure 4:
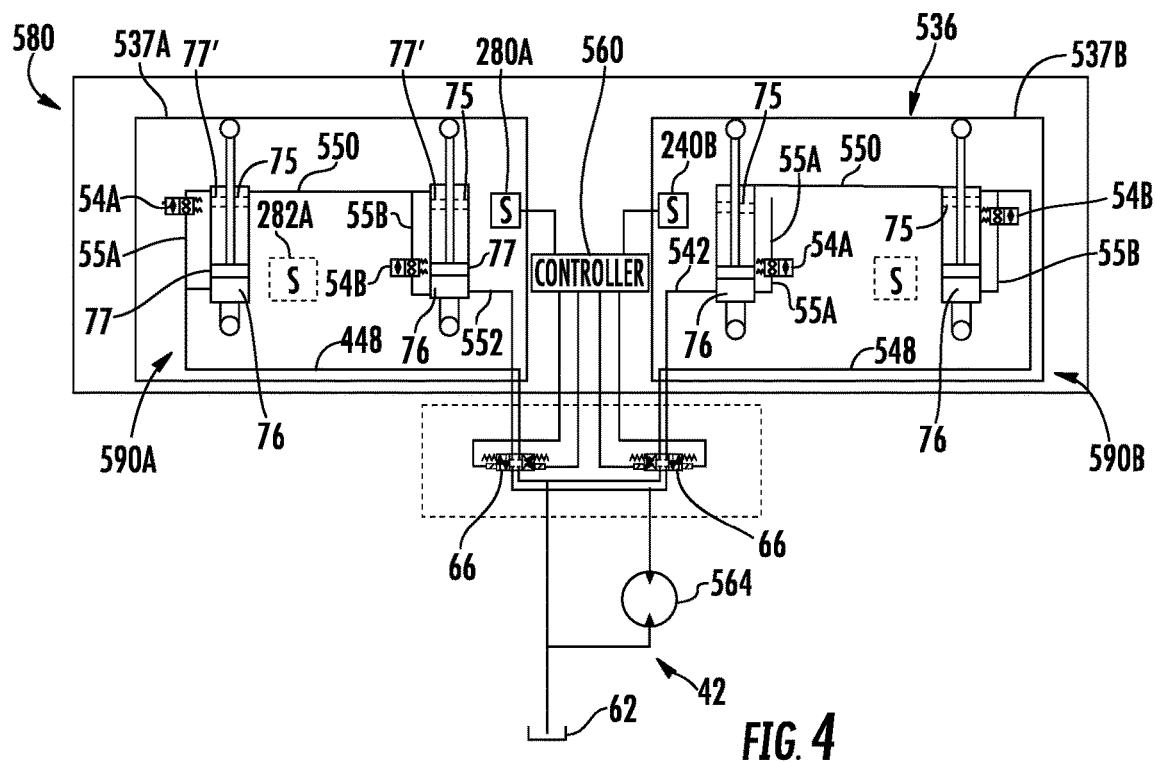
FIG. 4 is a schematic diagram of portions of other example reel positioning systems of an example multi-segment reel of a harvester head.

FIG. 4 schematically illustrates portions of another example harvester head 580. Harvest red 580 is similar to harvester head 530 described above except that harvester had 580 comprises positioning systems 590A and 590B in lieu of positioning systems 540A and 540B. The remaining components of harvest red 580 which correspond to components of harvester had 530 are numbered similarly.

Similar to reel positioning systems 540, reel positioning systems 590 are each connected to different portions of the associated reel segment 537 such that opposite motions of rods 74 of cylinders 44 move the associated reel segment 537 in the same direction. For example, extension of rod 74 of cylinder 44A moves a first portion of an associated reel segment 537 upwardly while retraction of rod 74 of cylinder 44B moves a second portion of the associated reel segment 537 upwardly. In another implementation, retraction of rod 74 of cylinder 44A moves a first portion of the associated reel segment 537 upwardly while extension of rod 74 of cylinder 44B moves a second portion the associated reel segment 537 upwardly. In yet another implementation, extension of rod 74 of cylinder 44A moves a first portion of the associated reel segment 537 forwardly while retraction of rod 74 of cylinder 44B moves a second portion of the associated reel segment 537 forwardly. In another implementation, retraction of rod 74 of reel 44A moves a first portion of the associated reel segment 537 forwardly while extension of rod 74 of cylinder 44B moves a second portion of the associated reel segment forwardly. Although each of such examples described as moving the reel either upwardly or forwardly, it should be appreciated that switching from a state of extension to a state of retraction and vice versa results in real segment 537 being moved in an opposite direction, downwardly or rearwardly in the respective examples.

Reel positioning systems 590 are each dissimilar to reel positioning systems 540 in that reel positioning systems 590 each comprise a hydraulic fluid line 550 that connects rod side 75 of hydraulic cylinder 44A to rod side 75 of hydraulic cylinder 44B. As a result, positioning errors due to the volumetric differences between rod side 75 and cap side 76 are minimized or eliminated. This may facilitate enhanced control of the rephasing of cylinders 44. Positioning systems 590 further comprise hydraulic lines 542 and 548 in lieu of hydraulic lines 448 and 452, respectively.

During normal operation (not a time of rephasing), rephasing valves 54 are maintained in a closed or blocking state. To reposition segments 537 in a first direction (upward/downward or forward/rearward), controller 560 actuates valves 66 and pump 564 such that hydraulic fluid is pumped through hydraulic fluid lines 448 into cap side 76 of piston 72 in cylinder 44A. This results in rod 74 of cylinder 44A being extended. This also results in fluid on rod side 75 flowing through hydraulic fluid line 550 to rod side 75 of piston 72 of cylinder 44B. This results in rod 74 being retracted. Because the volume of both rod side 75 are the same or approximately the same, rods 74 of cylinders 44A and 44B extend and retract by substantially the same extent, respectively, to reposition segments 537 in the first direction.

Likewise, to reposition segments 537 in a second direction, opposite to the first direction, controller 560 actuates valves 66 and pump 564 such that hydraulic fluid is pumped through hydraulic fluid line 552 into cap side 75 of piston 72 in cylinder 44B. This results in rod 74 of cylinder 44B being extended. This also results in fluid on rod side 75 flowing through hydraulic fluid line 550 to rod side 75 of piston 72 of cylinder 44A. This results in rod 74 being extended. Because the volume of both rod side 75 are the same or approximately the same, rods 74 of cylinders 44A and 44B extend and retract by substantially the same extent, respectively, to reposition reel segments 537 in the second direction.

As described above, over time, the positioning of pistons 72 in cylinders 44 may become offset from one another such that when rod 74 of cylinder 44A is fully extended, rod 74 of cylinder 44B is not fully retracted, and vice versa. This may result in reel 36 becoming canted or tilted in the vertical and/or horizontal direction. To address such an occurrence, controller 560 is configured to carry out rephasing of piston 72 of cylinders 44. Controller 560 is configured to output control signals that actuate each of rephasing valves 54 to the open or pass-through state. Controller 560 further outputs control signals to valves 66 and pump 564 so as to pump hydraulic fluid through hydraulic fluid line 548 to side 76 of hydraulic cylinder 44A. Due to the larger volume of the interior of side 75 of barrel 70 of cylinder 44A and the natural fluid resistance in the hydraulic lines of rephasing valve 54A, the pressure of the hydraulic fluid being pumped into side 76 of cylinders 44A initially moves piston 72 of cylinder 44A to its end of stroke position 77'. Once the end of stroke position 77' is attained by piston 72 of cylinder 44A, the pump hydraulic fluid is diverted across and through rephasing valve 54A through hydraulic line 550 to side 75 of hydraulic cylinder 44B, ensuring that piston 72 of cylinder 44B is also displaced to its end of stroke position 77. Once piston 72 of cylinder 44B has attained its end of stroke position 77, the pump hydraulic fluid begins to pass through rephasing valve 54B or passes through valve 54B at a greater rate into hydraulic line 452 and back to reservoir 62 of fluid supply 542. Following a predetermined period of time or in response to signals indicating that pistons 72 are once again in phase with one another, controller 60 is configured to output control signals actuating rephasing valves 54 back to their fluid blocking or closed states.

Alternatively, to rephase piston 72 at their other end of stroke positions, controller 560 is configured to output control signals that actuate each of rephasing valves 54 to the open or pass-through state. Controller 60 further outputs control signals to valve 66 and pump 564 so as to pump hydraulic fluid through hydraulic fluid line 552 to side 76 of hydraulic cylinder 44B. Due to the larger volume of the interior of side 76 of barrel 70 of cylinder 44B and the natural fluid resistance in the hydraulic lines of rephasing valve 54B, the pressure of the hydraulic fluid being pumped into side 75 of cylinders 44B initially moves piston 72 of cylinder 44B to its end of stroke position 77'. Once the end of stroke position 77' is attained by piston 72 of cylinder 44B, the pump hydraulic fluid is diverted across and through rephasing valve 54B through hydraulic line 550 to side 75 of hydraulic cylinder 44A, ensuring that piston 72 of cylinder 44B is also displaced to its end of stroke position 77. Once piston 72 of cylinder 44A has attained its end of stroke position 77, the pump hydraulic fluid begins to pass through rephasing valve 54A or passes through valve 54A at a greater rate into hydraulic line 548 and back to reservoir 62 of fluid supply 42. Following a predetermined period of time or in response to signals indicating that pistons 72 are once again in phase with one another, controller 60 is configured to output control signals actuating rephasing valves 54 back to their fluid blocking or closed states.

As described above, the initiation of rephasing in systems 590 may be triggered in a variety of different manners. In one implementation, a person or operator may input a command or selection to controller 560 triggering such rephasing. In another implementation, such rephasing may be automatically triggered based upon the sensed positioning of piston 72 and/or rod 74 relative to an end of stroke position for the piston 72 and/or rod 74, such as with the associated sensor 280. In another implementation, such rephasing may be automatically triggered based upon a sensed position and/or orientation of the segment 537 of reel 536, such as with sensors 280, and/or 282, wherein sensor 282, 282 sense positioning of different portions of segment 537. In another implementation, such rephasing may be triggered based upon a sensed relative positioning of piston 72 and/or rod 74 of different cylinders 44, based upon signals from sensors 280, 282, wherein sensor 280, 282 sense different positions of piston 72 and/or rod 74. In still another implementation, such rephasing may be automatically triggered based upon the receipt of a command instructing the repositioning of piston 72 and/or rod 74 to within a predetermined range of an end of stroke position 77, 77'.

As with listening systems 540 of harvester head 530, positioning systems 590 associated with the different segments 537A and 537B share fluid reservoir 62 and a bidirectional pump 564. Positioning system 540 are both controlled by controller 560 which facilitates synchronization of positioning systems 590.

In some circumstances, the two side-by-side segments 537 may themselves become offset relative to one another in a first direction (vertical direction or a fore-aft direction). Controller 560 is configured to further synchronize the positioning of segments 537 with respect to one another. To synchronize the positioning of segments 537 with respect to one another, controller 560 outputs control signals to valves 66 as well as rephasing valve 54 of each of systems 590 so as to reposition segments 537 at the same relative positions. In one implementation, controller 560 outputs control signals such that pistons 72 of cylinders 44 of both positioning systems 590 are actuated to the respective end of stroke positions such that both of segments 537 are fully raised, fully lowered, fully forward or fully rearward. In other words, positioning systems 590 are both rephased to an end of stroke state. In another implementation where the positioning of each of segments 537 is sensed by an associated sensor or where the positioning of each of pistons 72/rod 74 is sensed by an associated sensor (such as sensors 280, 282), controller 560 outputs control signals repositioning segments 537 such that segments 537 or piston 72/rod 74 are at the same relative positions (as determined from signals from the sensors) while piston 72 of cylinders 44 of each of systems 540 are at locations between their end of stroke positions.

The initiation of synchronization may be triggered in a variety of different manners. In one implementation, a person or operator may input a command or selection to controller 560 triggering such synchronization. In another implementation, such synchronization may be automatically triggered based upon the sensed positioning of piston 72 and/or rod 74 relative to an end of stroke position for the piston 72 and/or rod 74, such as with sensor 280A and/or 280B. For example, in response to receiving signals from sensor 280A and/or sensor 280B indicating an end of stroke position for a piston 72 or a near end of stroke position for piston 72, wherein the system two is within a predetermined range of an end of stroke position, controller 560 may automatically carry out synchronization. In one implementation, controller 56 may automatically carry out rephasing with respect to both of systems 590 so as also synchronize systems 540.

In another implementation, such synchronization may be automatically triggered based upon a sensed relative positions and/or orientations of segments 537, wherein sensors 280 are configured to sense the positioning of their respective segments 537A, 537B. In another implementation, such synchronization may be triggered based upon a sensed relative positioning of piston 72 and/or rod 74 of different cylinders 44, based upon signals from sensors 280, 282, wherein sensor 280, 282 sense different positions of piston 72 and/or rod 74. In still another implementation, such synchronization may be automatically triggered based upon the receipt of an operator generated or a controller generated command instructing the repositioning of piston 72 and/or rod 74 of at least one of systems 540 to within a predetermined range of an end of stroke position 77, 77'.

Figure 5:
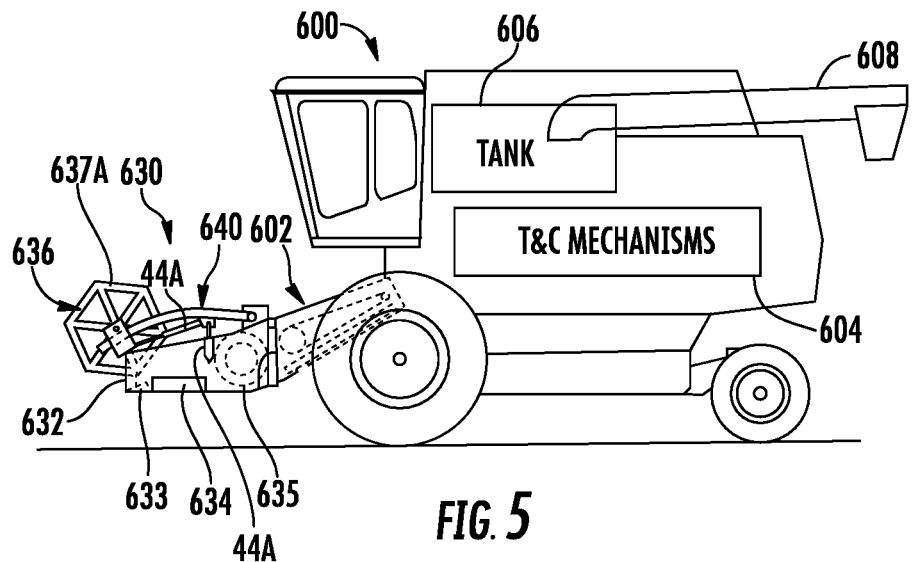
FIG. 5 is a side view of an example harvester.

FIG. 5 is a side view of an example harvester 600 comprising an example header 630. In addition to header 630, harvester 600 comprises feeder house 602, threshing and cleaning mechanisms 604, storage tanks 606 and unloader 608. Header 630 separates the crop or plant from a growing medium and direct such separated are severed crops to feeder house 602. Feeder house 602 transfers the crop to threshing and cleaning mechanisms 604. Threshing and cleaning mechanisms 604 (schematically shown) separate the grain or other crop portion from remaining portions of the severed crop. In one implementation, threshing and cleaning mechanisms 604 comprise mechanisms such as, threshing rotors, concaves, straw walkers, chaffers, sieves and the like, wherein the separated and cleaned grain is conveyed to storage tanks 606 and were in the remaining portions of the crop, such as material other than grain, are discharged from a rear of harvester 600. The grain or other crop may then later be discharged from tanks 606 by unloader 608.

As indicated above, header 630 separates the crop or plant from a growing medium and directs the crop to feeder house 602. In one implementation, header 630 is removably mounted to feeder house 602. In another implementation, header 630 is fixed to feeder house 602. As shown by FIG. 5, header 630 comprises frame 632, cutter bar 633, draper belt 634, feed drum 635, reel 636 and positioning systems 640. Frame 632 supports remaining opponents of header 630 and forms a platform for the collection of the crop being draper belt 634. Directed to feeder house 602. Cutter bar 633 severs the crop from the growing medium. In one implementation, cutter bar 63 comprises a reciprocating series of knives. Draper belt 634 comprises one or more belts that are driven to carry the crop to a central location adjacent feeder drum 635. Feeder drum 635 feeds the crop into feeder house 602.

Figure 6:
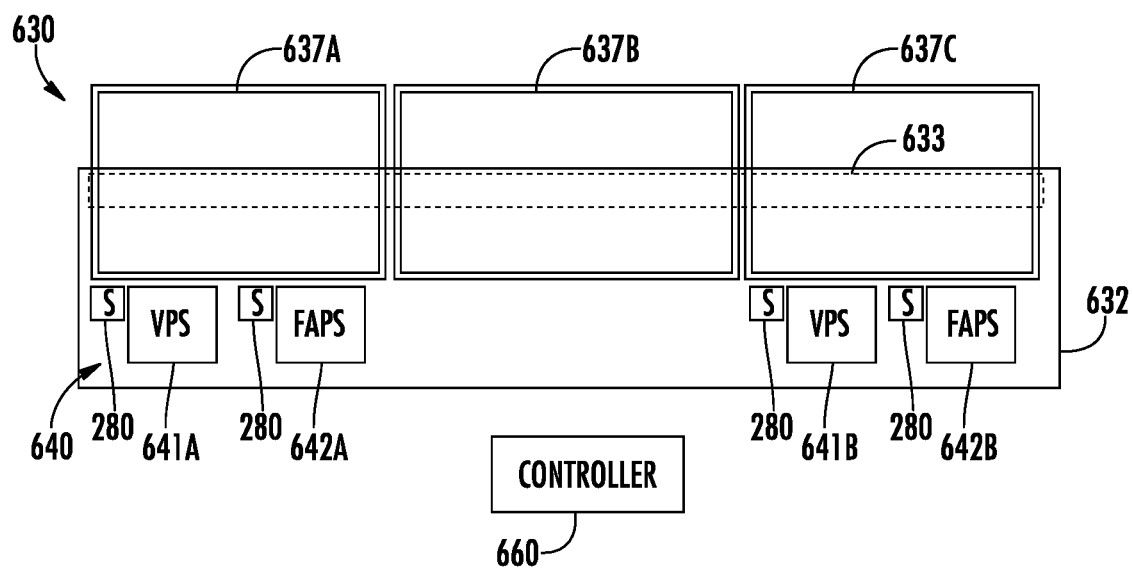
FIG. 6 is a top view schematically illustrating portions of a multi-segment reel of an example harvester head of the harvester of FIG. 5.
Figure 7:
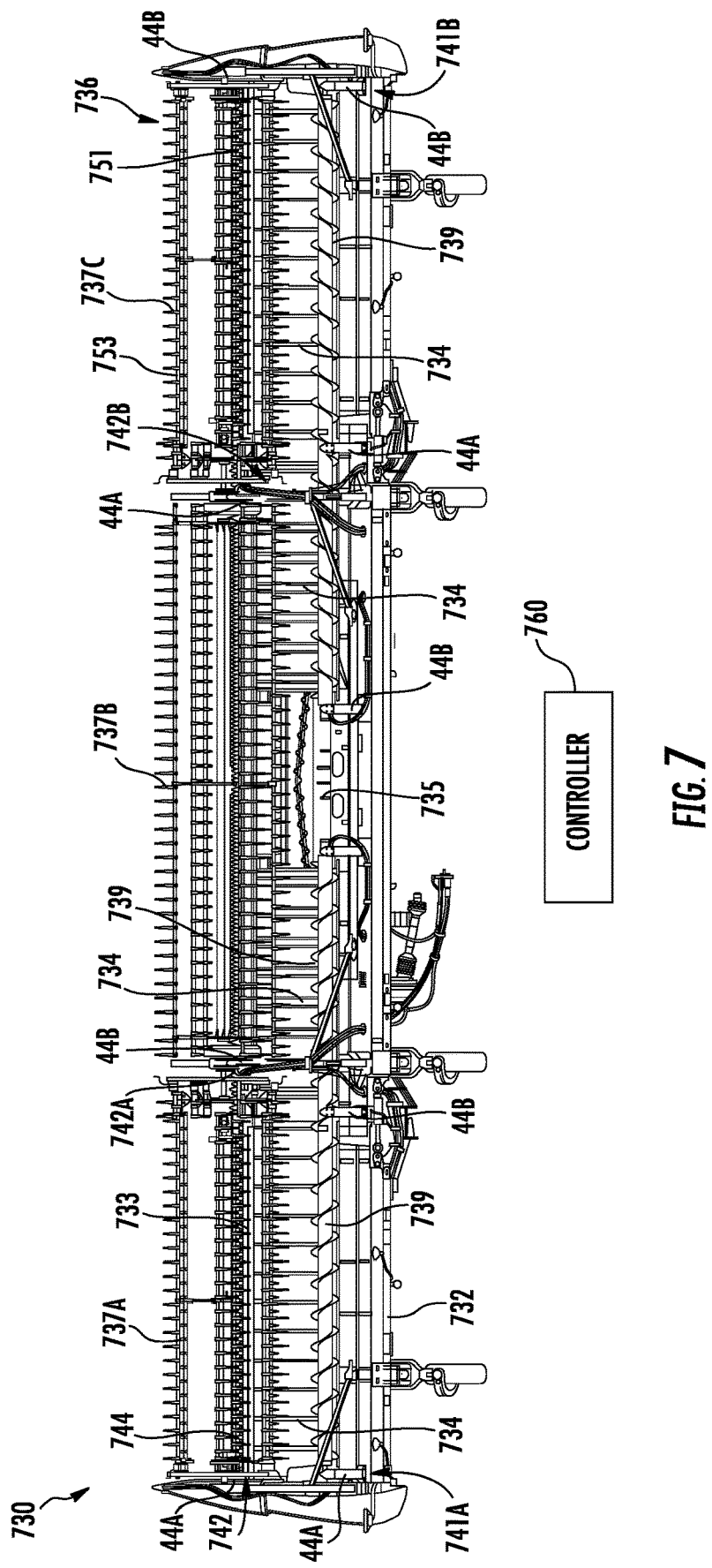
FIG. 7 is a top view of an example multi-segment reel of an example harvester head for the example harvester of FIG. 5.
Figure 8:
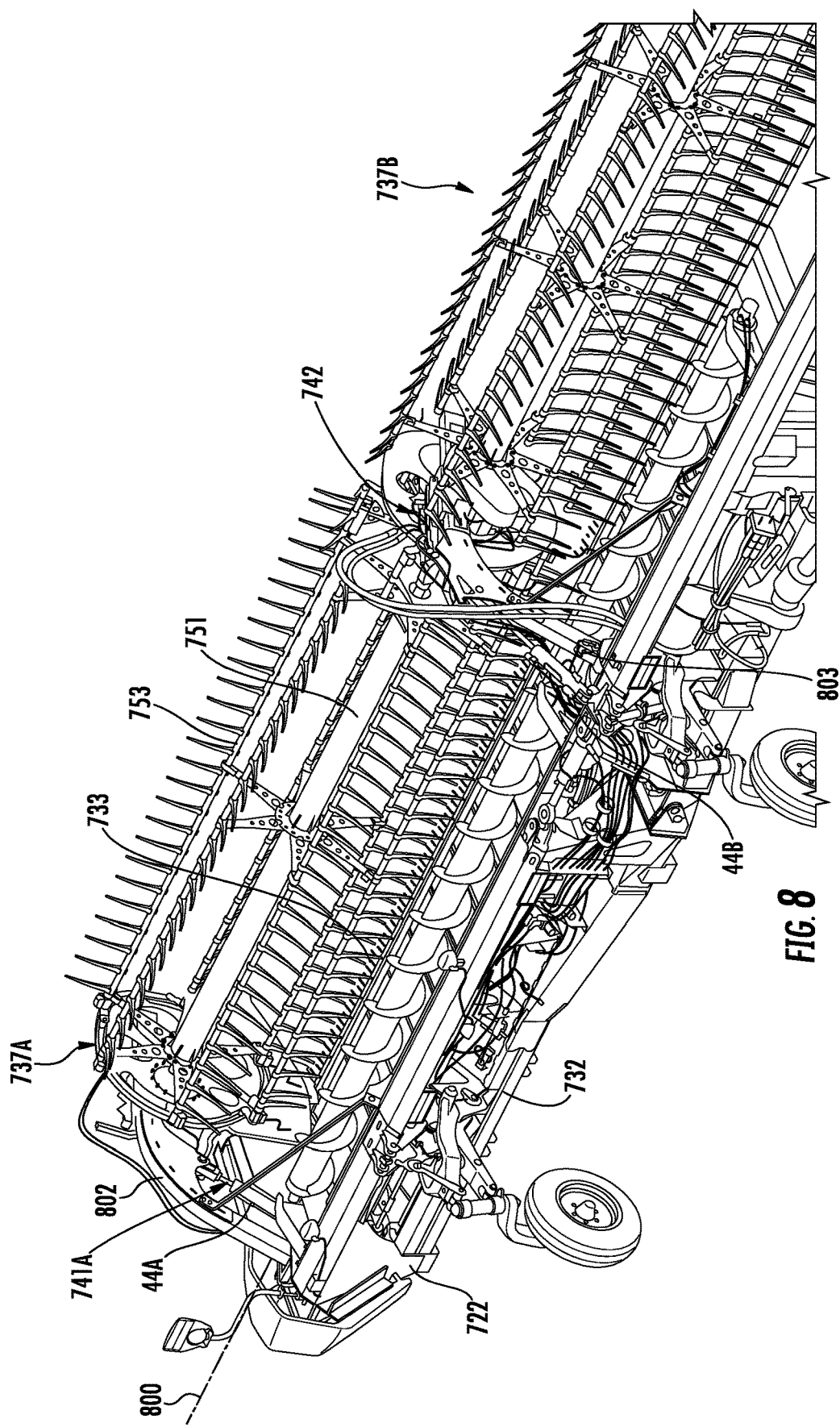
FIG. 8 is an enlarged fragmentary perspective view of a portion of the harvester head of FIG. 7.
Figure 9:
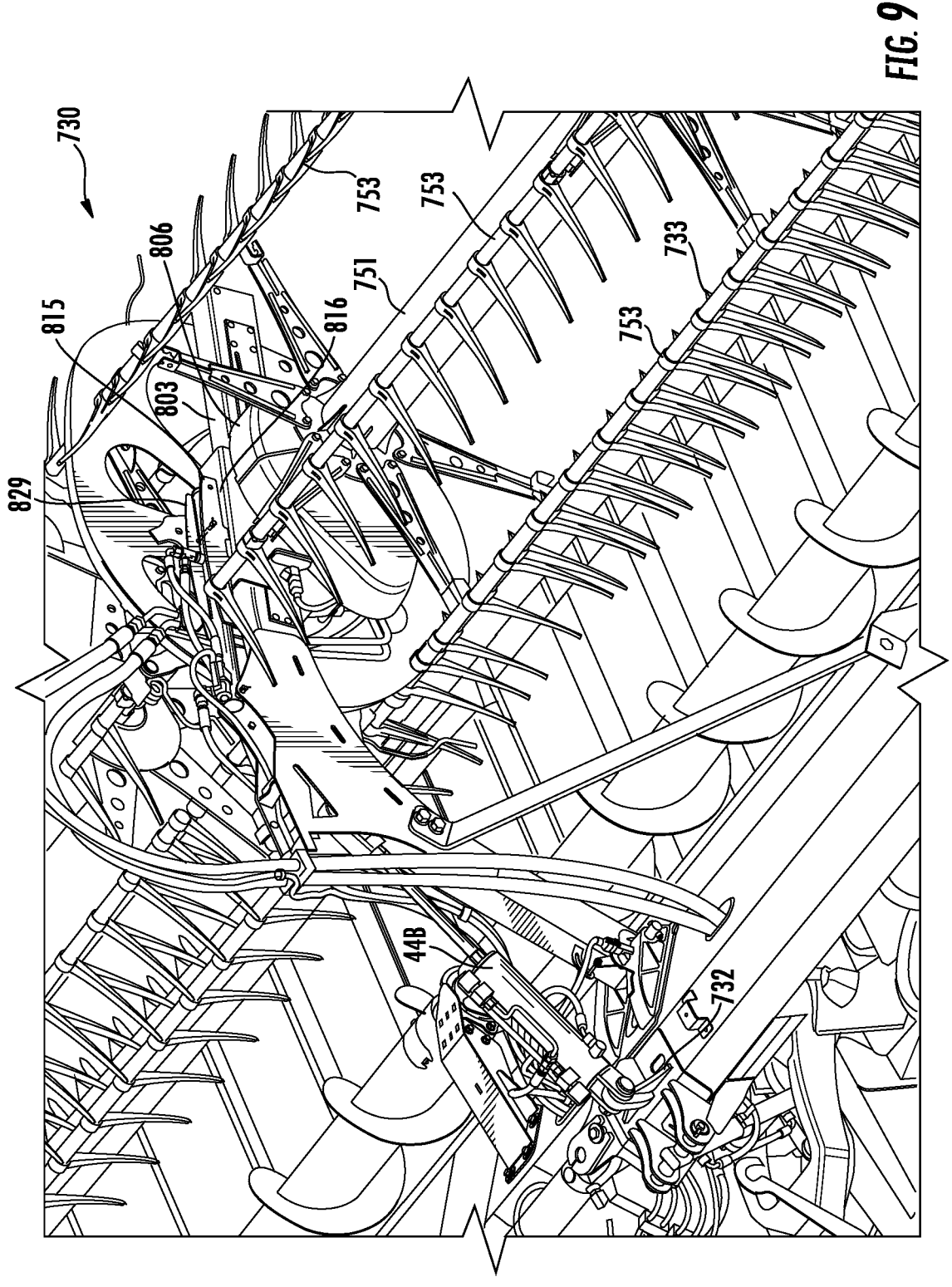
FIG. 9 is an enlarged fragmentary perspective view of a portion of the harvester head of FIG. 7.

FIG. 6 is a top view schematically illustrating reel 636 and positioning system 640. In the example illustrated, reel 636 is formed from three segments 637A, 637B and 637C (collectively referred to as segments 637. Segments 637 are rotatably supported above and forwardly beyond cutter bar 633. Segments 637 are rotatably driven to gather and direct crop towards cutter bar 633 and onto a draper belt 634 (shown in FIG. 5). In the example illustrated, each of segments 637 comprises a spindle supporting a series of circumferentially spaced bats that gather and direct the crop towards cutter bar 633 and draper belt 634. Segments 637 are each movable relative to one another in both vertical directions and fore-aft directions.

Positioning system 640 position segments 637 in the vertical directions and fore-aft directions. Positioning systems 640 comprise vertical positioning systems (VPS) 641A, 641B (collectively referred to as systems 641) and fore-aft positioning systems (FAPS) 642A, 642B (collectively referred to as systems 642). As described below, segments 637B shares the vertical and fore-aft positioning systems of segments 637A and 637C. In the example illustrated, the right side of segments 637A and the left side of segments 637B are concurrently raised and lowered by the right side hydraulic cylinder of vertical positioning system 641A. The right side of segments 637A and the left side of segments 637B are concurrently moved forwardly or rearwardly by the right side hydraulic cylinder of fore-aft positioning system 642A. The rephasing of the vertical positioning system 641A and 641B may be synchronized by controller 660 to maintain the vertical positioning of segment 637B in alignment with that of segments 637A and 637C.

Likewise, In the example illustrated, the left side of segment 637C and the right side of segments 637B are concurrently raised and lowered by the left side hydraulic cylinder of vertical positioning system 641B. The left side of segment 637C and the right side of segment 637B are concurrently moved forwardly or rearwardly by the left side hydraulic cylinder of fore-aft positioning system 642B. The rephasing of the fore-aft positioning system 642A and 642B may be synchronized by controller 660 to maintain the forward or rearward positioning of segment 637B in alignment with that of segments 637A and 637C.

Systems 641A and 641C move or adjust a vertical positioning of their respective segments 637C and 637B, which results in vertical adjustment of the opposite ends of segment 637B. Systems 642A and 642B move or adjust a fore-aft (frontward-rearward) positioning of the respective segments 637C and 637B, which results in fore-aft adjustment of the opposite ends of segments 637B. Each of positioning systems 641 is similar to positioning system 590A described above. Each of positioning systems 642 is similar to positioning system 540A described above. Controller 660 controls the rephasing of each positioning system 641, 642 as described above.

Controller 660 further synchronizes each of positioning systems 641 with respect to one another and each of systems 642 with respect to one another. Controller 660 synchronizes the positioning of the side-by-side segments 637A and 637C as described above with respect to the synchronization of the positioning of the side-by-side segments 537A and 537B. such synchronization results in the middle segment 637B also being maintained in vertical and fore-aft alignment with segments 637A and 637C. As a result, unless otherwise instructed, such as to accommodate terrain variations, controller 660 maintains segments 637 at the same vertical positions and at the same fore-aft positions.

Figure 10:
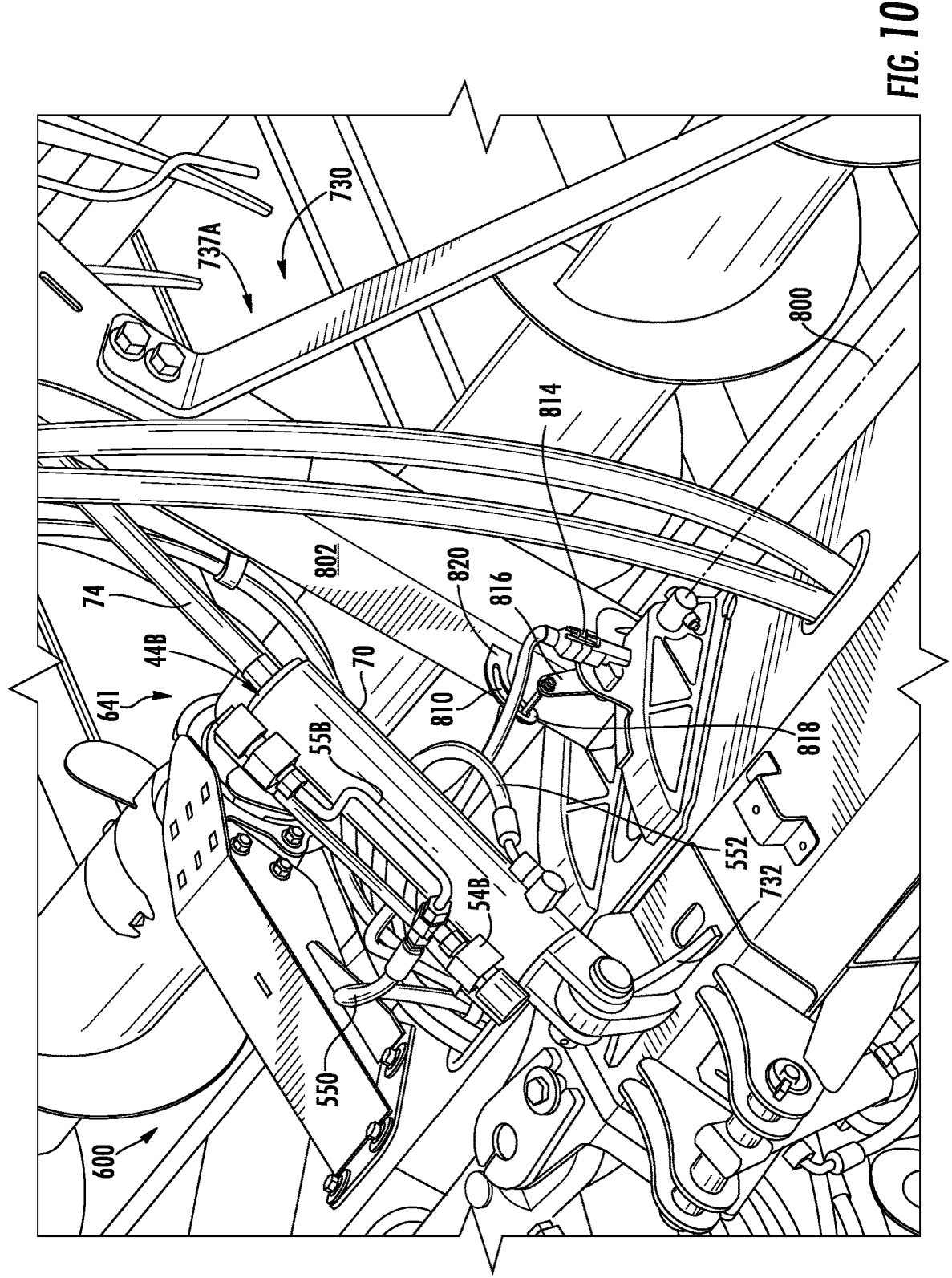
FIG. 10 is a large fragmentary perspective view of a portion of the harvester head of FIG. 7.

FIGS. 7-12 illustrate harvester header 730, an example implementation of harvester header 630 for use with harvester 600. As shown by FIG. 10, header 730 comprises frame 732, cutter bar 733, draper belts 734, and feed drum 735 which correspond in function to frame 632, cutter bar 633, draper belt 634 and feed drum 635, respectively, as described above. Header 730 additionally comprises augers 739 which assist in conveying crop laterally to feed drum 735. Header 730 additionally comprises positioning systems 641, 642 (described above).

Similar to header 630, header 730 comprises a reel 736 formed by three reel segments 737A, 737B and 737C (collectively referred to as segments 737). Segments 737 are rotatably supported above and forwardly beyond cutter bar 733. Segments 737 are rotatably driven to gather and direct crop towards cutter bar 733 and onto draper belt 734. In the example illustrated, each of segments 737 comprises a spindle 751 supporting a series of circumferentially spaced bats 753 that gather and direct the crop towards cutter bar 733 and draper belt 734. Segments 737 are each movable relative to one another in both vertical directions and fore-aft directions. As with header 630, segment 737B shares the vertical and fore-aft positioning systems of segments 737A and 737C. In the example illustrated, the right side of segment 737A and the left side of segment 737B are concurrently raised and lowered by the right side hydraulic cylinder of vertical positioning system 741A. The right side of segment 737A and the left side of segment 737B are concurrently moved forwardly or rearwardly by the right side hydraulic cylinder of fore-aft positioning system 742A. The rephasing of the vertical positioning system 741A and 741B may be synchronized by controller 760 to maintain the vertical positioning of segment 737B in alignment with that of segments 737A and 737C.

Likewise, In the example illustrated, the left side of segment 737C and the right side of segments 737B are concurrently raised and lowered by the left side hydraulic cylinder of vertical positioning system 741B. The left side of segments 737C and the right side of segment 737B are concurrently moved forwardly or rearwardly by the left side hydraulic cylinder of fore-aft positioning system 742B. The rephasing of the fore-aft positioning system 742A and 742B may be synchronized by controller 760 to maintain the forward or rearward positioning of segment 737B in alignment with that of segments 737A and 737C.

Systems 741A and 741B move or adjust a vertical positioning of their respective segments 737A and 737B, which results in vertical adjustment of the opposite ends of segments 737B. System 742A and 742B move or adjust a fore-aft (frontward-rearward) positioning of the respective segments 737A and 737B, which results in fore-aft adjustment of the opposite ends of segments 737B. Each of positioning systems 741 is similar to positioning system 590A described above. Each of positioning systems 742 is similar to positioning system 540A described above. Controller 760 controls the rephasing of each positioning system 741, 742 as described above.

Controller 760 further synchronizes each of positioning systems 741 with respect to one another and each of systems 742 with respect to one another. Controller 760 synchronizes the positioning of the side-by-side segments 737A and 737C as described above with respect to the synchronization of the positioning of the side-by-side segments 537A and 537B. such synchronization results in the middle segment 737B also being maintained in vertical and fore-aft alignment with segments 737A and 737C. As a result, unless otherwise instructed, such as to accommodate terrain variations, controller 760 maintains segments 737 at the same vertical positions and at the same fore-aft positions.

FIGS. 7-12 illustrate positioning systems 741A positioning each of reel segments 737 in a fully lowered state. FIGS. 10-15 illustrate positioning system 742 positioning each of reel segments 737 in a fully rear or aft state. As described above with respect to positioning system 641, the hydraulic cylinders 44 are arranged such extension of one hydraulic cylinder and retraction of the other hydraulic cylinder move different portions of the same segment in the same direction.

Positioning system 741A secures ends of the two hydraulic cylinders 44A and 44B to frame 732 on opposite sides of the pivot axis 800 of reel segment 737A. In the example illustrated, reel segment 737A comprises an outer guide bar 802 and an inner guide bar 803 that are pivotally connected to frame 732 for pivotal movement about axis 800. Guide bars 802, 803 carry bearings and drive assemblies 806 (shown in FIG. 12) which rotatably support spindle 751 and the associated bats 753. Cylinder 44A is attached at one end to frame 732 forward of axis 800 and at the other end to outer guide bar 802. Cylinder 44B is attached at one end to frame 732 rearward of axis 800 and at the other end to inner guide bar 803. In the example illustrated, rod 74 of both of cylinders 44A and 44B of positioning system 741A are pivotably attached to guide bars 802, 803. As a result, extension of cylinder 44A and collapse or retraction of cylinder 44B raise reel segment 737A in the left side of segment 737B. Retraction of cylinder 44B and extension of cylinder 44A lower reel segment 737A in the left side of segment 737B.

FIG. 10 illustrates sensor 280 of vertical positioning system 741 of segment 737A. As shown by FIG. 13, sensor 280 of positioning system 741 comprises slot 810 and rotational sensor 814. Slot 810 is carried by guide bar 802 and pivots about axis 800 with guide bar 802. Slot 810 extends in an arc having a radius centered about axis 800. Slot 810 has an arcuate length less than the arcuate travel of guide bar 802 about axis 800.

Rotational sensor 814 interacts with slot 810 to sense the angular positioning of guide bar 802 relative to axis 800. Rotational sensor 814 senses the rotation of an arm 816 received within slot 810. During pivoting of guide bar 802, slot 810 moves about axis 800. Prior to being rotated fully clockwise, to the extreme down position for reel segment 737A, the end 818 of slot 810 engages arm 816, causing arm 816 rotate in a clockwise direction. Likewise, prior to being rotated fully counterclockwise, to the extreme up position for reel segment 737A, the end 820 of slot 810 engages arm 816, causing arm 816 to rotate in a counterclockwise direction. Rotational sensor 814 senses a rotation of arm 816 so as to identify when guide bar 802 is approaching or at the fully up position or when guide bar 802 is approaching or at the fully down position, corresponding to the end of stroke positions of hydraulic cylinder 44B. In one implementation, rotational sensor 814 comprises a rotary Hall effect sensor that senses the rotation of arm 816. In other implementations, sensor 280 of positioning system 741 may have other configurations.

Figure 11:
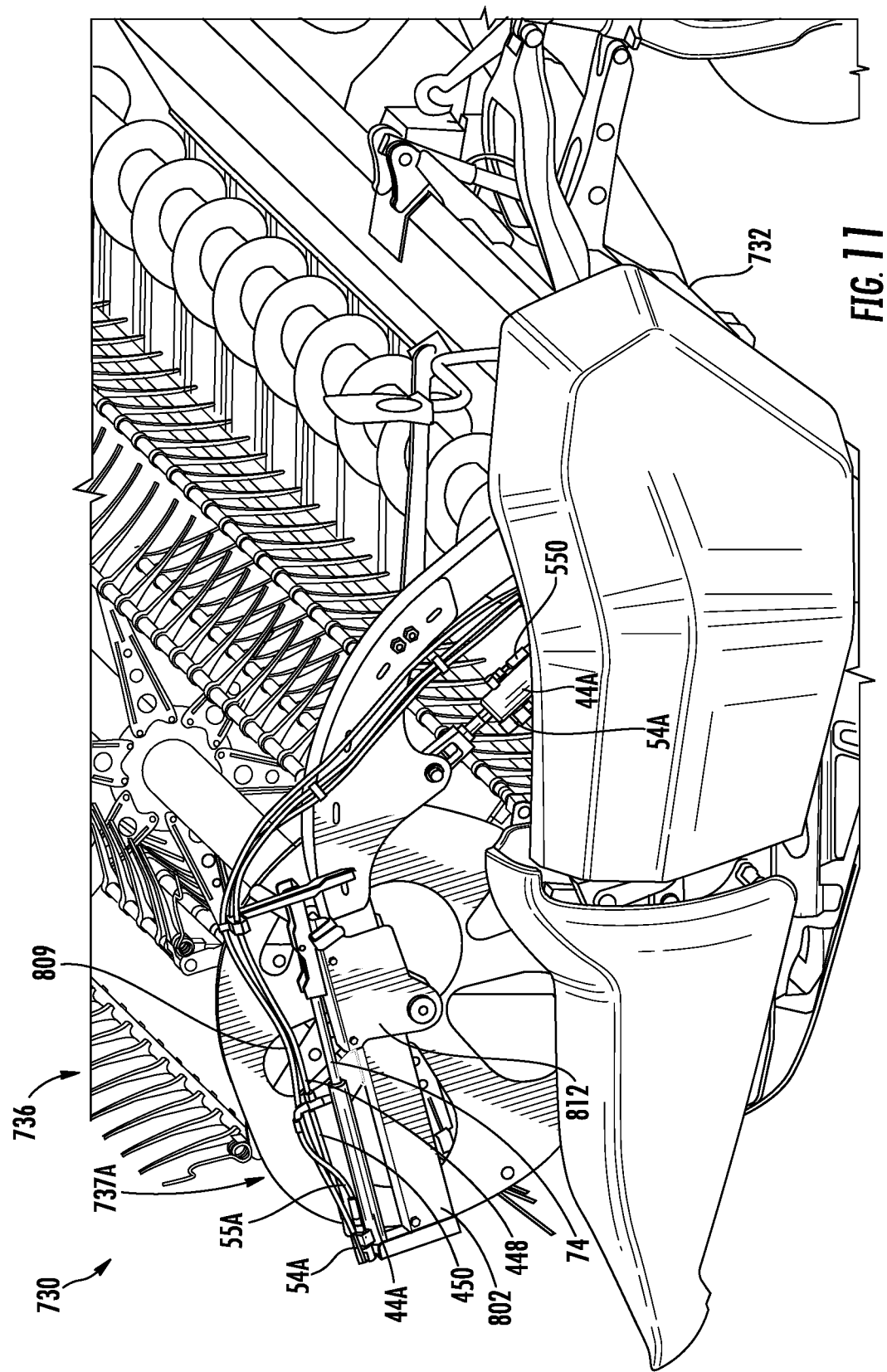
FIG. 11 is an enlarged fragmentary perspective view of a portion of the harvester head of FIG. 7.
Figure 12:
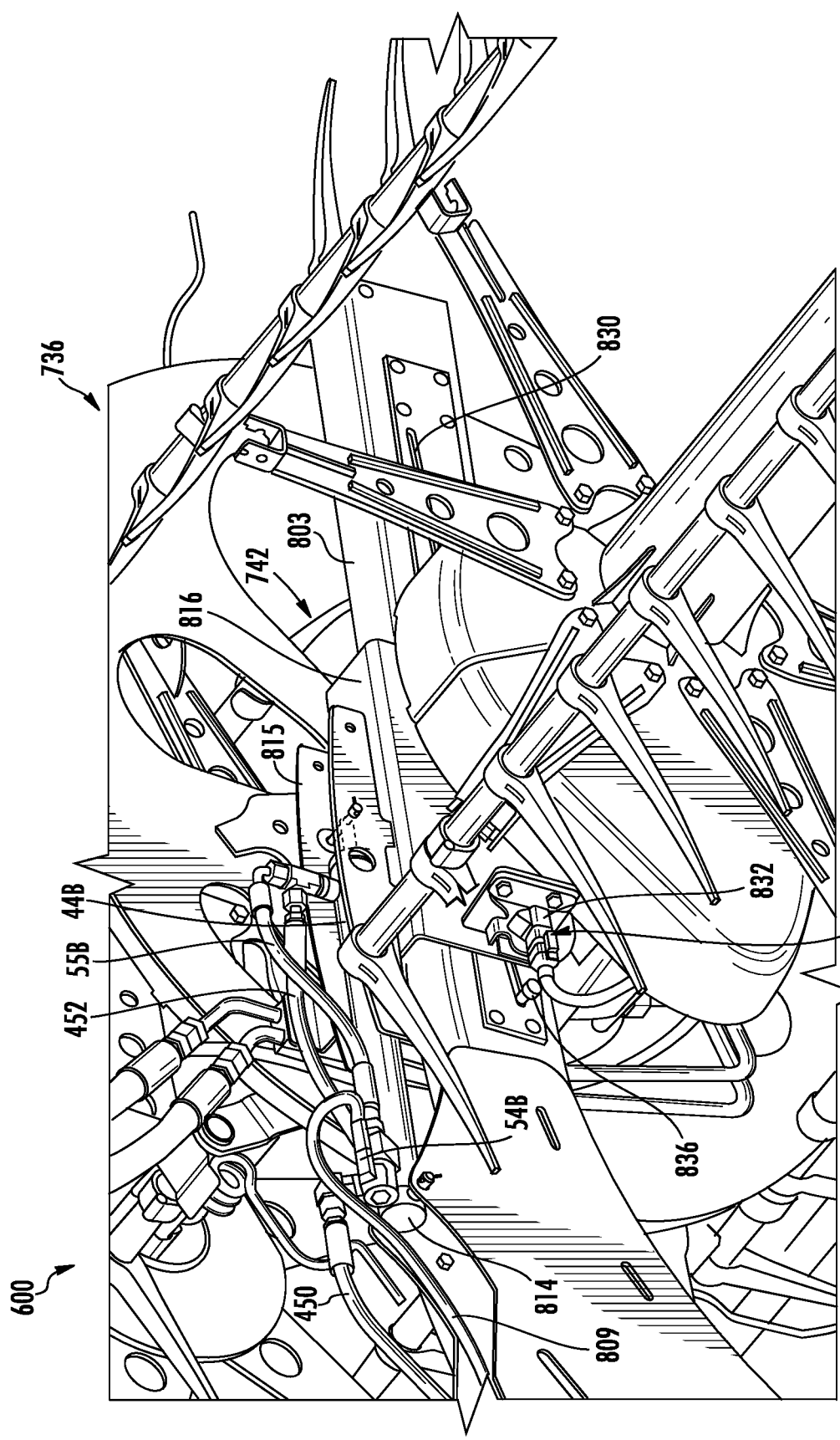
FIG. 12 is an enlarged fragmentary effective view of a portion of the harvester head of FIG. 7.

FIGS. 11 and 12 illustrate the connection of cylinders 44 of positioning system 742. As shown by FIG. 14, reel segment 737A comprises a carrier sleeve 812 which supports the remainder of reel segment 737A and which is slidable along guide bar 802. Cylinder 44 has a cylinder end mounted to an end of outer guide bar 802 and a rod 74 connected to carrier sleeve 812 which is slidable along guide bar 802. Retraction of rod 74 pulls carrier sleeve 812 and the carried reel segment 737A in a forward direction from the extreme aft position shown in FIG. 11.

As shown by FIG. 12, reel segment 837A comprises a carrier sleeve 832 which supports the remainder of reel segment 837A and which is slidably supported along inner guide bar 803. Hydraulic cylinder 44B has a cylinder end 814 pinned to a bracket mounted to guide bar 803. Cylinder 44B has its rod 74 pinned to a weldment 815 that is fixed to carrier sleeve 832. Extension of rod 74 pushes carrier sleeve 832 and the carried reel segment 737A (as well as the left side of segment 737B) in a forward direction from the extreme aft position shown in FIG. 14.

FIG. 12 further illustrates sensor 280 of positioning system 741. Sensor 280 comprises slot 830 and rotational sensor 832. Slot 830 extends along guide bar 803. Slot 830 is inclined toward a forward end of guide bar 803. Rotational sensor 832 is carried by carrier sleeve 816 and comprises a pin 836 which is received within slot 830. As carrier 3816 moves along guide bar 803, pin 836 rides within slot 830. The slope or inclination of slot 830 pivots or rotates pin 836, wherein the pivoting or rotation of pin 836 is sensed by rotational sensor 832 which output signals to controller 760 indicating the fore-aft positioning of carrier sleeve 816 and reel segment 837A along guide bar 803. The signals output by rotational sensor 832 based upon the angular position of pin 836, which are dependent upon its position along slot 830, indicate the corresponding position of cylinder 44B and indicate whether cylinder 44B is at an end of stroke position. In one implementation, rotational sensor 832 may comprise a rotary Hall effect sensor. In other implementations, sensor 280 of positioning system 742 may have other configurations.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A harvester head comprising:
a frame;
a position adjustable reel having a first segment and a second segment movably supported by the frame;
a hydraulic supply comprising a pump and a reservoir;
a first plurality of hydraulic cylinders coupled to the first segment to reposition the first segment;
a second plurality of hydraulic cylinders coupled to the second segment to reposition the second segment;
a first bidirectional valve operably coupled between the hydraulic supply and the first plurality of hydraulic cylinders;
a second bidirectional valve operably coupled between the hydraulic supply and the second plurality of hydraulic cylinders;
at least one sensor to sense relative positioning of the first segment and the second segment; and
a controller to output control signals to the first bidirectional valve and the second bidirectional valve based upon signals from the at least one sensor to synchronize positioning of the first segment and the second segment.

2. The harvester head of claim 1, wherein the first plurality of hydraulic cylinders comprises:
a first hydraulic cylinder comprising a first barrel housing a first displaceable piston separating an interior of the first barrel into first side and a second side, the first displaceable piston having a first rod connected to a first portion of the reel;
a second hydraulic cylinder comprising a second barrel housing a second displaceable piston separating an interior of the second barrel into a first side and a second side, the second displaceable piston having a second rod connected to a second portion of the reel;
a first hydraulic fluid line connecting the hydraulic supply to the first side of the first hydraulic cylinder;
a second hydraulic fluid line connecting the second side of the first hydraulic cylinder to the first side of the second hydraulic cylinder;
a first selectively actuatable rephasing valve fluidly coupling the first side of the first hydraulic cylinder to the first side of the second hydraulic cylinder;
a second hydraulic fluid line connecting the second side of the second hydraulic cylinder to the hydraulic supply;
a second selectively actuatable rephasing valve fluidly coupling the first side of the second hydraulic cylinder to hydraulic supply, wherein the controller is to selectively open and close the first selectively actuatable rephasing valve and the second selectively actuatable rephasing valve to re-phase the first displaceable piston and the second displaceable piston with respect to one another.

3. The harvester head of claim 2, wherein the first rod and the second rod are connected to the first portion and the second portion, respectively, of the reel such that extension of the first rod moves the reel in a first direction and extension of the second rod moves the reel in a second direction opposite the first direction, wherein the first side of the first hydraulic cylinder comprises a rod side of the piston and wherein the first side of the second hydraulic cylinder comprises a cap side of the piston.

4. The harvester of claim 3, wherein the first direction is a forward direction and wherein the second direction is a rearward direction.

5. The harvester of claim 3, wherein the first direction in an upwards direction and wherein the second direction is a downward direction.

6. The harvester of claim 2 further comprising a sensor on the first hydraulic cylinder to output a signal to the controller indicating a position of the first piston.

7. The harvester of claim 6 further comprising a second sensor on the second hydraulic cylinder to output a signal to the controller indicating the position of the second piston, wherein the controller is to initiate rephasing of the first piston and the second piston based upon signals from the first sensor and the second sensor.

8. The harvester of claim 7, wherein the controller is to initiate rephasing of the first piston and the second piston based upon signals from the first sensor and the second sensor while neither of the first piston nor the second piston is at an end of stroke position.

9. The harvester of claim 8, wherein the controller is to automatically initiate rephasing of the first piston and the second piston based upon a comparison of a position of the first piston and a position of the second piston.

10. A method comprising:
sensing a relative position of a first segment of a reel of a harvester head with respect to a second segment of the reel of the harvester head;
comparing the sensed relative position to a predetermined threshold;
repositioning a first bidirectional valve to actuate a plurality of hydraulic cylinders coupled to the first segment and repositioning a second bidirectional valve to actuate a second plurality of hydraulic cylinders coupled to the second segment, based upon the comparison, to synchronize positioning of the first segment and the second segment.

11. The method of claim 10 further comprising:
supplying hydraulic fluid under pressure from a hydraulic pump to a first side of a first displaceable piston in a first hydraulic cylinder to displace the first displaceable piston and move a first portion of the first segment;
transferring hydraulic fluid from a second side of the displaceable piston in the first hydraulic cylinder to a first side of a second displaceable piston in a second hydraulic cylinder to displace the second displaceable piston to move a second portion of the second segment; and
rephasing the first displaceable piston and the second displaceable piston relative to one another by selectively actuating a first rephasing valve to deliver hydraulic fluid from the first side of the first displaceable piston to the first side of the second displaceable piston and by selectively actuating a second rephasing valve to deliver hydraulic fluid from the first side of the second displaceable piston to a hydraulic reservoir.

12. The method of claim 11 further comprising sensing a position of the first displaceable piston, wherein the rephasing is automatically initiated based upon the sensed position of the first displaceable piston.

13. The method of claim 12 further comprising sensing a position of the second displaceable piston, wherein the rephasing is initiated in response to the sensed position of the first displaceable piston and the sensed position of the second displaceable piston.

14. The method of claim 13, wherein the rephasing is automatically initiated in response to a comparison of the sensed position of the first displaceable piston and the sensed position of the second displaceable piston.

15. The method of claim 14, wherein the rephasing is initiated while neither of the first displaceable piston nor the second displaceable piston or at an end of stroke position.

16. The method of claim 11, wherein the rephasing is initiated while neither of the first displaceable piston nor the second displaceable piston are at an end of stroke position.

17. A harvester head comprising:
a frame;
a position adjustable reel having a first segment and a second segment movably supported by the frame;
a hydraulic supply comprising a pump and a reservoir;
a first plurality of hydraulic cylinders coupled to the first segment to reposition the first segment, the first plurality of hydraulic cylinders comprising:
  a first hydraulic cylinder comprising a first barrel housing a first displaceable piston separating an interior of the first barrel into a rod side and a cap side, the first displaceable piston having a first rod connected to a first portion of a respective one of the first segment and the second segment;
  a second hydraulic cylinder comprising a second barrel housing a second displaceable piston separating an interior of the second barrel into a rod side and a cap side, the second displaceable piston having a second rod connected to a second portion of the first segment;
  a first hydraulic fluid line connecting the hydraulic supply to the rod side of the first hydraulic cylinder;
  a second hydraulic fluid line connecting the cap side of the first hydraulic cylinder to the rod side of the second hydraulic cylinder;
  a first selectively actuatable rephasing valve fluidly coupling the rod side of the first hydraulic cylinder to the rod side of the second hydraulic cylinder; and
  a second selectively actuatable rephasing valve fluidly coupling the cap side of the second hydraulic cylinder to the hydraulic supply;
a second plurality of hydraulic cylinders coupled to the second segment to reposition the second segment, the second plurality of hydraulic cylinders comprising:
  a third hydraulic cylinder comprising a third barrel housing a third displaceable piston separating an interior of the third barrel into a rod side and a cap side, the third displaceable piston having a third rod connected to a first portion of the second segment;
  a fourth hydraulic cylinder comprising a fourth barrel housing a fourth displaceable piston separating an interior of the fourth barrel into a rod side and a cap side, the fourth displaceable piston having a fourth rod connected to a second portion the second segment;
  a third hydraulic fluid line connecting the hydraulic supply to the rod side of the third hydraulic cylinder;
  a fourth hydraulic fluid line connecting the cap side of the third hydraulic cylinder to the rod side of the fourth hydraulic cylinder;
  a third selectively actuatable rephasing valve fluidly coupling the rod side of the third hydraulic cylinder to the rod side of the fourth hydraulic cylinder;
  a fourth selectively actuatable rephasing valve fluidly coupling the cap side of the fourth hydraulic cylinder to the hydraulic supply;
a first bidirectional valve operably coupled between the hydraulic supply and the first plurality of hydraulic cylinders;
a second bidirectional valve operably coupled between the hydraulic supply in the second plurality of hydraulic cylinders;
a first sensor to sense a stroke position of one of the first hydraulic cylinder and the second hydraulic cylinder;
a second sensor to sense a stroke position of one of the third hydraulic cylinder and the fourth hydraulic cylinder; and
a controller to (1) selectively actuate the first rephasing valve and the second rephasing valve based upon signals from the first sensor; (2) selectively actuate the third rephasing valve and the fourth rephasing valve based upon signals from the second sensor; and (3) to selectively actuate the first bidirectional valve and the second bidirectional valve based upon a comparison of signals from the first sensor and the second sensor to synchronize positioning of the first segment and the second segment.

18. The harvester head of claim 17, wherein the first rod and the second rod are connected to the first portion and the second portion, respectively, of the reel such that extension of the first rod moves the first segment in a first direction and extension of the second rod moves the first segment in a second direction opposite the first direction, wherein the first side of the first hydraulic cylinder comprises a rod side of the piston and wherein the first side of the second hydraulic cylinder comprises a cap side of the piston.

19. The harvester of claim 18, wherein the first direction is a forward direction and wherein the second direction is a rearward direction.

20. The harvester of claim 18, wherein the first direction in an upwards direction and wherein the second direction is a downward direction.

* * * * *